Dec. 13, 1960 E. T. HERMAN 2,963,754
REFRIGERATOR DOOR SEAL
Filed Nov. 14, 1957

INVENTOR.
EUGENE T. HERMAN
BY
*R. L. Miller*
ATTORNEY

2,963,754

REFRIGERATOR DOOR SEAL

Eugene T. Herman, St. Marys, Ohio, assignor to The Goodyear Tire & Rubber Company, Akron, Ohio, a corporation of Ohio Filed Nov. 14, 1957, Ser. No. 696,501

2 Claims. (Cl. 20—69)

This invention relates to a gasket for refrigerator or freezer cabinets and the like. More particularly it relates to an improved gasket for effecting a seal between the door and cabinet under the more stringent specifications presently demanded by the manufacturers.

The refrigerators and freezers presently being manufactured include door mountings that require very low forces to open, due to legislation passed by Congress. As a result the forces acting to compress the seal around the door when it is closed are low so that the seal must be effected initially under minimum unit pressures on the gasket. Under such conditions, the compression set and normal softening of the gasket must be counteracted in the design and/or material selection to provide a gasket which will be effective for substantial periods of time. It is therefore an object of this invention to provide a gasket that effectively seals under low unit pressures between the door and cabinet of a refrigerator.

Another object of the invention is to provide a gasket that inherently compensates for compression set in the gasket to maintain an effective seal after long use.

A still further object of the invention is to provide a gasket that meets the more rigid specifications now in effect.

Other objects of this invention will appear hereinafter as the description of the invention proceeds, the novel features, arrangements and combinations being clearly set forth in the claims hereunto appended.

Figure 1:
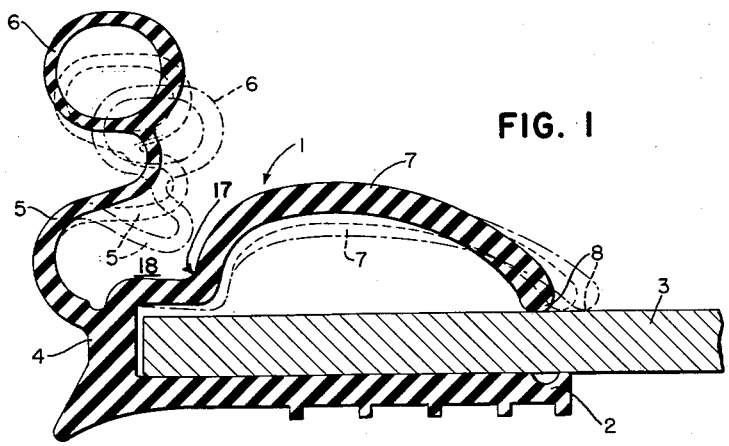
Fig. 1 is a cross-section of one form of a refrigerator gasket made in accordance with the invention.

The gasket 1 as seen in Fig. 1 is an extruded section of resilient material such as rubber, natural or synthetic, polyethylene, polyvinyl chloride, etc. The use of such materials for gaskets of this type is well known. For the purposes of illustration, the gasket 1 includes a flange 2 which underlies the door panel 3 so as to provide means for attaching the gasket to the refrigerator door. Particular means provided to attach the gasket to the door will depend upon the particular door structure and may be varied accordingly without affecting the sealing portion of the gasket.

Along the edge of the flange 2 is a vertical section 4 which extends approximately to the upper edge of the door panel 3. Extending in a generally vertical direction from this vertical section 4 is an ogee portion 5 which curves first outwardly and then inwardly to support a tubular sealing portion 6 substantially over the vertical portion 4. The ogee section 5 is relatively thin in order to make it very flexible when it is subjected to pressure by closing the door.

Also, at the upper end of the vertical section 4 is a laterally inwardly extending cantilever portion 7 which overlies the inner surface of the door panel 3. The inner end of the cantilever portion 7 lies on the surface of the door panel and is unattached. The cantilever section 7 cooperates with the ogee portion 5 to provide the desired sealing stresses when the door is closed and a finished appearance to the door structure.

In effecting the seal when the refrigerator door is closed, the gasket 1 provides a substantial range of deflections with which a satisfactory seal may be effected. The gasket as installed is shown by the solid line in Fig. 1 and the position indicated by the dash line illustrates the approximate minimum deflection necessary which will effect a good seal around the refrigerator door while the broken line position indicates a maximum deflection to effect a good seal. In either of these positions the tubular portion 6 of the refrigerator gasket 1 is flattened to provide substantial surface area contact on the outer surface of the tube with the cabinet. If desired, the contacting surface of the sealing surface may be ribbed, roughened etc. as is well known to assist in effecting the seal. As the ogee portion 5 foreshortens, the tubular portion 6 moves inwardly and somewhat laterally due to the foreshortening of the ogee portion 5. When the surface of the tubular portion 6 contacts the refrigerator cabinet (not shown), the subsequent lateral shift is accomplished by a rolling action rather than slippage over the surface. The ogee portion 5 assumes approximately the shape indicated in which the ogee is foreshortened by increasing the severity of curvature over the undistorted shape. It is apparent that the distortion of the ogee portion 5 of the gasket is accomplished with very low pressures per inch of length so that the sealing between the refrigerator door and the cabinet is effected with low unit pressures.

The cantilever section 7 during the closing similarly flattens as indicated by dashed and dotted lines (slightly exaggerated for sake of clarity) due to the transmission of the stresses through the gasket section so that the inner end 8 of the cantilever section moves slightly inwardly over the door surface as the sealing section is distorted. The relief of these stresses in the gasket assist in returning the gasket to its initial shape when the door is opened.

Figure 2:
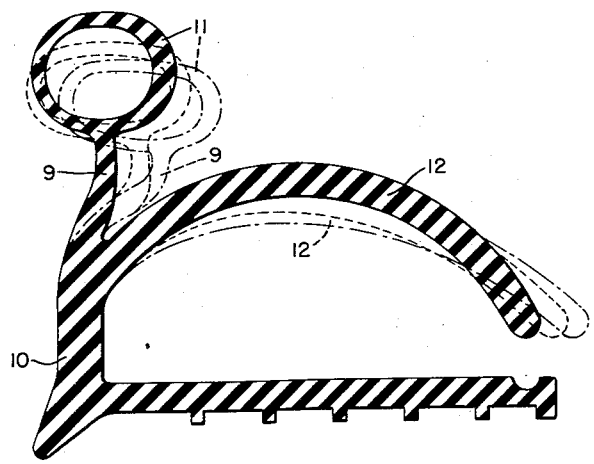
Fig. 2 is a cross-section of one modification of the invention.

In the modification shown in Fig. 2 the ogee section 9 is less severe in curvature with the entire direction of curvature being inwardly from the vertical section 10 than that shown in Fig. 1 but the tubular section 11 supported from the ogee section 9, lies substantially over the vertical section 10 of this gasket. The dashed and broken lines illustrate the positions of the gasket under minimum and maximum deflections respectively. In this modification the tubular element 11 is deflected more due to the smaller amount of curvature in the ogee section. The tubular portion 11 also moves laterally as the deflection increases in the same manner as described in connection with Fig. 1. The ogee section 9 tends to fold laterally inwardly over the cantilever arm portion 12 which simultaneously flattens in a similar manner to that desirable for the modification shown in Fig. 1.

Figure 3:
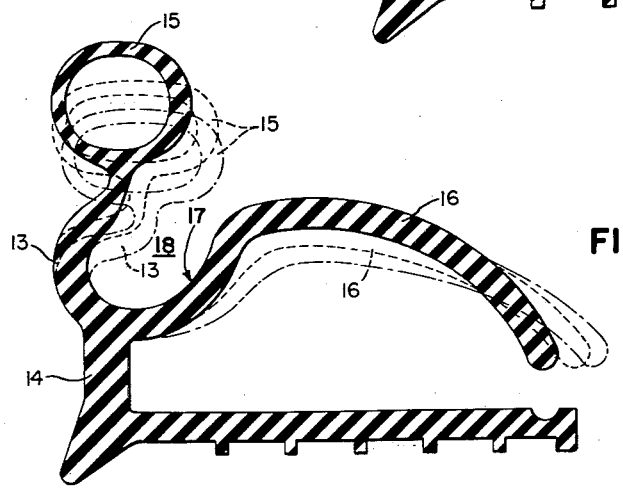
Fig. 3 is a cross-section of another modification of the invention.

In the modification shown in Fig. 3 the ogee portion 13 extends substantially vertically upward from the vertical portion 14 to support the tubular sealing portion 15. In this modification the ogee section 13 curves slightly outwardly then inwardly from its point of origin to cause a substantially direct vertical inward movement of the tubular section when distorted by the closing door. The tubular section 15 flattens when subjected to such pressures to effect the seal against the door. The minimum and maximum deflection positions of the gasket portions are illustrated by the dashed and broken lines respectively including the positions of the cantilever portion 16.

In the modifications of the invention shown in Figs. 1 and 3 the cantilever portions 7 and 16 respectively are attached to the vertical portions 4 and 14 respectively by a joining portion 17. The portion 17 extends for a short distance towards the free end of the cantilever member 7 or 16 over and substantially parallel to the base then swings upwardly in a generally vertical direction so as to form with the ogee section 5 or 13 a pocket or chamber 18. The ogee section collapses into the pocket 18 as the refrigerator door closes to the extent that the ogee and tubular sections are collapsed substantially before contacting the cantilever member. This provides a soft seal for a substantial distance of door travel after the initial contact which is followed with a firm seal if that distance is exceeded.

In any of the modifications of the invention shown the ogee section and tubular section of each form of the gasket cooperate to effect a very soft seal or low unit pressure sealing gasket. The ogee and tubular sections in effect act as a wand to seal readily by distortion when the door is closed. The ogee section causes the gasket to assume a uniform distorted shape throughout its length with the tubular portion actually sealing against the cabinet surface. Gaskets of these configurations can be installed around corners of the door structure without the usual preformed corners or reshaping of the gasket structure in the corner area.

The configuration of any of the gaskets of this invention is such that stresses introduced by the deflection are distributed over a relatively large section so that the unit stress is low. This minimizes the compression set of the gasket material resulting in a seal that is effective for many years. The particular configuration also permits a wide latitude in the deflection without materially affecting the effectiveness of the seal.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A gasket for attachment to a refrigerator door to seal the margin of the door against the cabinet comprising an elongated unitary strip of resilient material of similar cross-sectional shape throughout its length, said shape having a base portion to secure said strip to the door, a vertical portion rising upwardly from and attached to one end of said base portion, a joining portion attached to the upper end of said vertical portion extending substantially parallel to and overlying said base portion for a short distance, then extending generally in a vertical upward direction away from said base portion, a convexly arched cantilever member having one end attached to the upper end of said joining portion and overlying said base whereby the other end thereof is free to move laterally with respect to said base and the door to which the gasket is secured, and a sealing portion formed integrally with said base extending from the upper end of said vertical portion above the cantilever member, said sealing portion consisting of a free-standing ogee-shaped section with one end attached adjacent the upper end of the vertical portion and extending upwardly therefrom substantially normal to said cantilever member with a closed tubular sealing element of a diameter substantially greater than the thickness of the ogee section integrally formed on the outer end thereof to initially contact the cabinet as the door moves toward the closed position, the outer end of said ogee-shaped section being unsupported by other structure and cooperating with the joining portion to form an open-topped pocket therebetween and the size of the opening in said tubular sealing element being at least several times greater than the wall thickness of the element, the ogee section collapsing substantially axially and uniformly along the length of the gasket into said pocket when closing the door on which the gasket is attached to foreshorten the ogee section in substantially the direction of its initial extension, the tubular element and ogee section being appreciably flattened prior to any substantial flattening of the cantilever member when the door of the refrigerator is closed.

2. A gasket for attachment to a refrigerator door to seal the margin of the door against the cabinet comprising an elongated unitary strip of resilient material of similar cross-sectional shape throughout its length, said shape having a base portion to secure said strip to the door, a vertical portion rising upwardly from and attached to one end of said base portion, a joining portion attached to the upper end of said vertical portion and extending substantially parallel to and overlying said base portion for a short distance, then extending generally in a vertical upward direction away from said base portion, a convexly arched cantilever member having one end attached to the upper end of said joining portion and overlying said base whereby the other end thereof is free to move laterally with respect to said base and the door to which the gasket is secured and a sealing portion formed integrally with said base positioned to extend from the upper end of said vertical portion above the cantilever member, said sealing portion consisting of a free-standing ogee-shaped section with one end attached adjacent the upper end of the vertical portion and extending upwardly therefrom substantially normal to said cantilever member with a closed tubular sealing element of a diameter substantially greater than the thickness of the ogee section integrally formed on the outer end thereof to initially contact the cabinet as the door moves toward the closed position, the outer end of said ogee-shaped section being unsupported by other structure and cooperating with the joining portion to form an open-topped pocket therebetween and the opening of the tubular element being normally slightly oval shaped with the major axis extending substantially parallel to the door surface and being at least several times greater than the wall thickness of the tubular element, the ogee section collapsing substantially axially and uniformly along the length of the gasket into said pocket when closing the door on which the gasket is attached to foreshorten the ogee section in substantially the direction of its initial extension, the tubular element and ogee section being appreciably flattened prior to any substantial flattening of the cantilever member when the door of the refrigerator is closed.

References Cited in the file of this patent

UNITED STATES PATENTS

| | | |
|---|---|---|
| 2,165,399 | McCormick | July 11, 1939 |
| 2,307,093 | Yoxsimer et al. | Jan. 5, 1943 |
| 2,528,264 | Coppock et al. | Oct. 31, 1950 |
| 2,816,331 | Moore | Dec. 17, 1957 |

FOREIGN PATENTS

| | | |
|---|---|---|
| 559,007 | Great Britain | Jan. 31, 1944 |